United States Patent [19]
Hentschel

[11] 3,808,503
[45] Apr. 30, 1974

[54] ELECTRONIC MOTOR PROTECTION RELAY WITH CURRENT-DEPENDENT RELEASE ACTION

[75] Inventor: Michael Hentschel, Hannover, Germany

[73] Assignee: Sprecher & Schuh AG, Aarau, Switzerland

[22] Filed: May 11, 1973

[21] Appl. No.: 360,374

[30] Foreign Application Priority Data
May 23, 1972 Switzerland............... 7571/72

[52] U.S. Cl..................... 317/13 B, 317/27, 317/33
[51] Int. Cl........................ H02h 7/08, H02h 7/085
[58] Field of Search............ 317/13 R, 13 B, 27, 33, 317/40, 36 T, 36 D, 33 C; 318/471, 473; 323/22; 337/81, 88

[56] References Cited
UNITED STATES PATENTS

| | | | |
|---|---|---|---|
| 3,531,689 | 9/1970 | Horn................. | 317/33 R |
| 3,351,814 | 11/1967 | Riebs................ | 317/36 T D |
| 3,262,017 | 7/1966 | Ashenden et al..... | 317/36 T D |
| 3,634,871 | 1/1972 | Siedband............ | 317/40 R |
| 3,312,867 | 4/1967 | Sonnemann.......... | 317/33 C |
| 3,312,875 | 4/1967 | Mayer............... | 317/33 C |
| 3,467,890 | 9/1969 | Mayer............... | 317/33 C |
| 3,418,529 | 12/1968 | Attewell............ | 317/33 C |
| 3,105,920 | 10/1963 | Dewey............... | 317/36 T D |
| 3,319,127 | 5/1967 | Zocholl............. | 317/36 T D |
| 3,317,795 | 5/1967 | Steen................ | 317/36 T D |

Primary Examiner—J. D. Miller
Assistant Examiner—Patrick Salce
Attorney, Agent, or Firm—Eric H. Waters

[57] ABSTRACT

An electronic motor protection relay having current-dependent response and controlled by a measurement voltage proportional to the motor current. An electrical motor simulation circuit reproduces the heating characteristics of the motor by means of the charging operation of a capacitive storage and is supplied by a charging current source which is controlled by the measurement voltage, with a charging current, which by means of the measurement voltage is a function of the motor current. The charging voltage is applied via the capacitive storage of the motor simulation circuit, to the control input of a threshold value trigger circuit which triggers shut-down of the motor current as soon as the charging voltage has exceeded a trigger threshold value.

3 Claims, 5 Drawing Figures

ELECTRONIC MOTOR PROTECTION RELAY WITH CURRENT-DEPENDENT RELEASE ACTION

BACKGROUND OF THE INVENTION

The present invention relates to a new and improved construction of electronic motor protection relay having current dependent triggering or release action, and which is controlled by a measurement voltage proportional to the motor current.

For the protection of electric motors against impermissibly high heating there are generally employed bimetallic relays, so called T-relays, in which the bimetal constitutes a thermal reproduction of the motor. For satisfactory protection of the motor it is necessary that the time-constant of the bimetal at least approximately corresponds to the time-constant of the motor by means of which it heats-up to the boundary temperature. Conventional electric motors, however, possess time-constants which are oftentimes much greater than that of the bimetal of T-relays, so that at best, there only can be generally attained with a T-relay an unsatisfactory protection, especially during intermittent operation of the motor. Owing to such considerable differences in the time-constants, it is possible for a T-relay to already respond before the motor has reached the boundary or permissible temperature, especially in the case of motors which are difficult to start. In order to prevent the same the T-relay is generally shunted during the starting phase of the motor, and therefore, the motor is completely without any protection during this period of time. What is also unsatisfactory is the fact that a T-relay, owing to the absence of any possibility of setting its characteristic, cannot be optimumly accommodated to the relevant motor, and furthermore, erroneous triggering of the relay can occur if satisfactory safeguards against vibrations or jarring are not provided. A decisive drawback of such relays is their relatively low response or triggering accuracy, which does not permit operation of the motor to a point exactly corresponding to the boundary temperature and prevents economical utilization of the motor.

These and still further drawbacks and defects can be overcome with the use of electronic motor protection relays. Since the motor current can change approximately in a ratio of 1:20 and since there should be present, when using different types of motors, a trigger or response range which is between for instance about 2 seconds and 2 hours, the electronic motor relay must exhibit appropriate time-constants and the trigger times should not fluctuate with varying ambient temperatures in a manner which would impair operational accuracy. Furthermore, these operating characteristics must be attained with relatively simple means in order that there can be realized better protection in an economical manner with the electronic motor protection relay, even when employed in conjunction with motors of small output, than the already priceworthy T-relays.

SUMMARY OF THE INVENTION

Hence, it is a primary object of the present invention to provide an improved construction of electronic motor protection relay having a current-dependent response or triggering action and which is not associated with the aforementioned drawbacks and limitations of the prior art proposals and also is extremely reliable in operation and economical.

Another and more specific object of the present invention relates to an improved construction of electronic motor protection relay by means of which, with relatively slight expenditure, it is possible to attain an expanded response range of, for instance, two seconds to two hours, and increased accuracy of the trigger or response time than was possible with the conventional T-relays.

Now in order to implement these and still further objects of the invention, which will become more readily apparent as the description proceeds, the inventive electronic motor protection relay is manifested by the features that there is provided an electric motor simulation circuit which reproduces the heating characteristics or behavior of the motor by means of the charging of capacitive storage and this electric motor simulation circuit or simulator is supplied by a charging current source with a charging current, which by means of the measurement voltage is a function of the motor current, and which charging current source is controlled by the measurement voltage. Further, the charging voltage is applied via the capacitive storage of the motor simulation circuit to the control input of a threshold value trigger circuit which shuts-off the motor current as soon as the charging voltage has exceeded a trigger threshold value.

Since the copper- and iron losses of the motor can be determined by the charging current of the controlled charging current source the motor protection relay can be adjusted without difficulty in such a way that the charging voltage across the capacitive storage of the motor simulation circuit characterizes the heating of the motor. For very long trigger or response times the motor simulation circuit advantageously possesses as high as possible internal resistance. This requires for the threshold value trigger circuit an impedance converter with high input resistance and at the charging current source leads to controlled charging currents, the low current intensity of which is in a range which is only slightly difficult to control for instance in the range of nanoamperes. For preventing the thus resulting drawbacks for the construction of the controlled charging current source and the threshold value trigger or trigger circuit the charging current can be delivered in a clocked or time fashion to the motor simulation circuit and the charging voltage of the capacitive storage can be applied in a clocked or timed fashion at the threshold value trigger, whereby preferably there is selected a timing or clock ratio of the duration of the working time to the duration of the rest time which is considerably smaller than 1, for instance 1/1,000 or less and is constant. The effective charging current with which there is supplied the capacitive storage of the motor simulation circuit is then equal to the product of the charging current and the clock ratio, and the charging current source can deliver a correspondingly greater charging current. The charging current source which is controlled by the measurement voltage can be constituted by an amplifier circuit having, at its operating region, a linear current-voltage characteristic, and forwardly of which there is connected a functional amplifier for transforming the measurement voltage into a control signal corresponding to the functional dependency of the charging current upon the motor current. Since for a wide variation range of the motor current, for instance 1:20, the functional amplifier of the charging current source has a large regulating range and accordingly must be of complicated design, it is advantageous if the capacitive storage of the motor simulation circuit is supplied in a timed or clocked fashion via the measurement voltage and dependent upon the motor current and the function of higher order of the motor current prescribed for the effective charging current is formed by the product of a first function of lower order for the charging current of the controlled charging current source and a second function of lower order for the clock ratio of the clocking or timing operation, so that the large regulating or control range for the effective charging current is sub-divided over the charging current source and the clocking operation, and both then only need a corresponding smaller regulating range. As a result, there is not only realized a saving in structural components or elements, but especially also an increased accuracy in the supply of the capacitive storage. In the simplest case the capacitive storage of the motor simulation circuit can be supplied with a charging current which is proportional to the square of the motor current. In the case of a motor current which only slightly varies, the controlled charging current source can consist of an amplifier circuit ahead of which there is arranged a squaring block and a clocking or cycling of the charging current with a constant clock ratio can be provided. On the other hand, in the case of a motor current which markedly varies it is advantageous to employ as the controlled charging current source an amplifier circuit which, controlled by the measurement voltage, delivers a charging current proportional to the motor current, and further to clock this charging current with a clock ratio proportional via the measurement voltage likewise to the motor current, so that the effective charging current for the capacitive storage is proportional to the square of the motor current. For clocking the charging current there can be advantageously provided an electronic switching mechanism which is actuated by a clock generator, and the switching path of the electronic switching mechanism is connected in circuit between the charging current source and the motor simulation circuit whereby the block generator is controlled by the measurement voltage. In order to vary the clock ratio of the clock generator it is possible to either vary the pulse width (working clock duration) with constant frequency, or the frequency with constant pulse width, as a function of the measurement voltage.

Since in the case of high motor currents the charging voltage across the capacitive storage of the motor simulation circuit changes considerably more quickly than at lower motor currents and since as a result thereof, with clocked application of the charging voltage at the threshold value trigger, there can occur inaccuracies with higher motor currents, the working clock or timing pulses are advantageously of the same duration and the sequence frequency of the working clock pulses is proportional to the motor current by means of clocking operation controlled as a function of a measurement voltage, so that the charging voltage of the motor simulation circuit with high motor currents can be more frequently applied to the threshold value trigger than at lower motor currents. For the motor current-dependent clocking of the charging current and the charging voltage derived from the motor simulation circuit there can be provided a common switch mechanism which is actuated by a clock generator controlled by the measurement voltage. The generator can be preferably composed of an integrater and a monostable multivibrator having a Schmitt-trigger input. In order to reduce the influence of leakage currents at the motor simulation circuit and in the switching mechanism to the trigger time the switching mechanism actuated by the clock generator can contain a reversing switch which connects the input of the motor simulation circuit in the work position at the controlled charging current source and in the rest position via the resulting leakage resistance of the switching mechanism and the motor simulation circuit at the trigger threshold voltage of the trigger, and wherein advantageously the basepoint of the capacitive storage of the motor simulation circuit is raised in potential. In this regard there can be connected for the protection of the motor simulation circuit in the event of interruption in the supply voltage, at the base point of the capacitive storage an electronic switch controlled by the supply voltage, and by means of which, in the presence of interruption in the supply voltage, the capacitive storage can discharge to null potential.

BRIEF DESCRIPTION OF THE DRAWINGS

The Invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
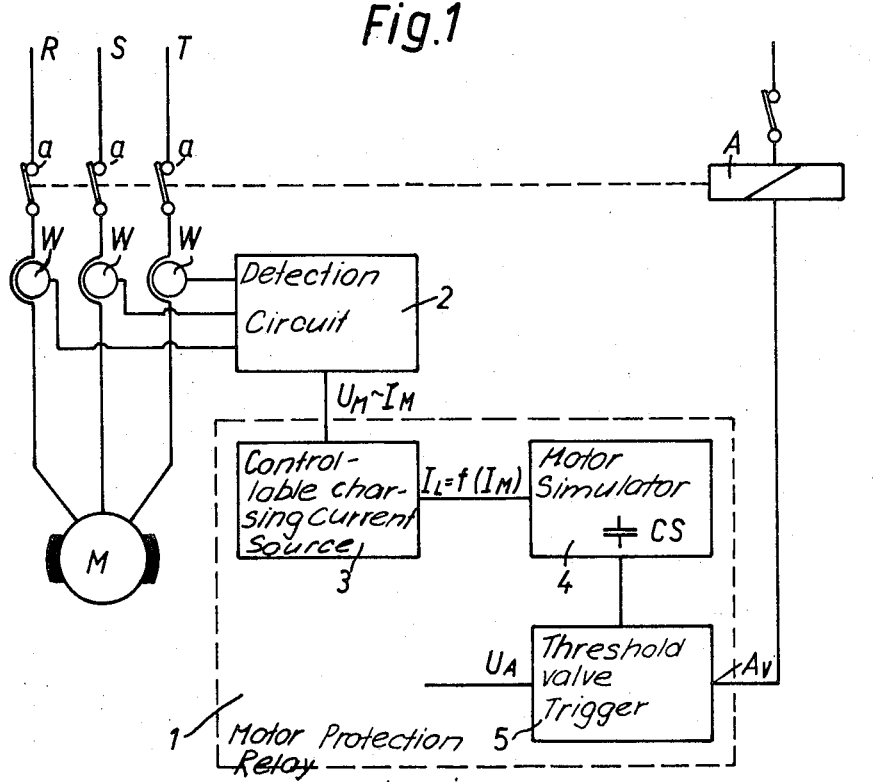
FIG. 1 is a block circuit diagram depicting the construction principles of the electronic motor protection relay of this development.

Describing now the drawings the basic principles of the construcion of an electronic motor protection relay according to the teachings of this invention has been depicted in the block circuit diagram of FIG. 1. In this FIG. 1 there are employed for the illustrated three-phase motor $M$ three current converters $W$ which are connected to the phase conductors or lines $R$, $S$, $T$ for the detection of the motor current. These three current converters $W$ may be, for instance, ring core converters which deliver a respective output voltage which is proportional to the current intensity prevailing at the relevant phase conductor. The output voltages of the converters $W$ are amplified at a detection circuit 2, rectified and processed into a measurement voltage $U_M$, which is proportional to the sum of the three current values at the phase conductors $R$, $S$, $T$, in other words, proportional to the motor current $I_M$. The processing of the three output-voltages into the measurement voltage $U_M$ preferably occurs in series fashion, although parallel processing is equally possible.

At the detection circuit 2 there is connected the actual motor protection relay 1. This motor protection relay 1 embodies an electric motor simulator or motor simulating circuit 4 having a capacitive storage $CS$, which is supplied by the charging current $I_L$ of a controllable charging current source 3. The controllable charging current source 3 receives from the detection circuit 2 the measurement voltage $U_M \sim I_M$ and delivers a charging current $I_L$ which in accordance with the measurement voltage $U_M$ is a function of the motor current $I_M$, i.e., $I_L = f(I_M)$, wherein the function $f$ for the charging current is chosen such that the charging voltage $U_T$ across the capacitive storage CS is proportional to the heating of the motor $M$. The motor simulator 4 contains at least one RC-element and the capacitors of the simulator 4 form its capacitive storage $CS$. Owing to the second power-dependency of the copper losses of the motor upon the motor current at least one component of the charging current, with appropriate construction of the motor simulator, the charging current $I_L$ is proportional to the square of the motor current $I_M$. A threshold value trigger circuit 5 is arranged following the motor simulator 4 and at the output $A_V$ of such trigger circuit there is connected the winding of a switching relay or protection relay $A$. When the temperature of the motor $M$ approaches the boundary temperature and the charging voltage $U_T$ of the capacitive storage $CS$ exceeds the trigger threshold value which has been set for this boundary temperature, then the voltage at the output $A_V$ of the threshold value trigger or trigger circuit 5 shifts to null, so that the coil or winding of the protection relay A is de-energized and the switching contacts $a$ in circuit with the phase conductors or lines $R$, $S$, $T$ are opened.

Figure 2:
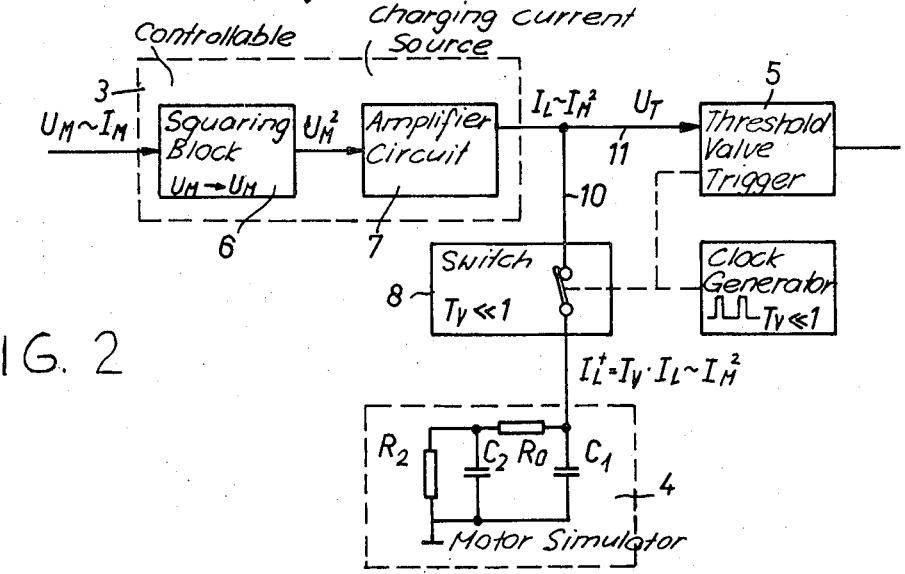
FIG. 2 is a block circuit diagram of an exemplary embodiment of motor protection relay in which a capacitive storage is supplied by a charging current proportional to the square of the motor current.

An advantageous construction of the motor protection relay 1 contains a motor simulator circuit 4 consisting of two RC-elements (FIG. 2), at which there is electrically simulated by means of both of the capacitors $C_1$ and $C_2$ the thermal capacity of the motor winding and the thermal capacity of the motor stator respectively, and by means of both of the resistors $R_1$ and $R_2$ there is respectively simulated the heat transfer resistance of the winding to the stator and from the stator to the surrounding air (cooling air). This motor simulator 4, which can still contain further RC-elements for improving the matching or accommodation of the system to different types of motors, is supplied with an effective charging current $I_L 115$, which is proportional to the square of the motor current $I_M$. With the exemplary embodiment of motor protection relay as depicted in FIG. 2, the controllable charging current source 3 delivers a charging current which is proportional to the square of the motor current $I_M$, in other words $I_L \sim I_M^2$. The charging current source 3 contains an amplifier circuit 7 having a linear current-voltage characteristic over its operating range, and ahead of which amplifier circuit there is connected a squaring block 6. At the squaring block 6 there is transformed the measurement voltage $U_M$ which is proportional to the motor current $I_M$ into an output voltage $U_M^2$, and by means of which there is controlled the amplifier circuit 7.

With motor currents around the rated current $I_N$ the motor simulator charges approximately in accordance with an e-function to a final value which is proportional to the boundary temperature of the motor. For such motor current intensities the trigger or response times are very long; thus, for instance, with a motor current of 1.1 $I_N$ the response or trigger time can amount to two hours or more. The charging time of the motor simulator 4 increases with decreasing intensity of the charging current and with increasing capacitance. For reasons of economy and technological reasons it is not possible to employ for the motor simulator either capacitors of very high capacitance or randomly high-ohmic resistors. In order to attain long charging times the trigger threshold voltage in any event for the threshold value trigger is therefore placed as closely as possible to the final value of the charging voltage, that is to say, the response or trigger threshold is shifted as much as possible into the upper portion of the charging voltage characteristic which has the course of an e-function, so that at the same time there can be attained improved utilization of the motor. In this connection it is necessary that neither the terminal or final value nor the trigger threshold possess fluctuations which, for instance, can be caused by changes in the ambient temperature.

With the embodiment depicted in FIG. 2 the output of the controllable charging current source 3 is coupled with the motor simulator 4 and with the control input of the threshold value trigger 5. Since the threshold value trigger 5 should not load the motor simulator 4 its input resistance is considerably greater, for instance by a factor of 100, than the internal resistance of the motor simulator, which for instance amounts to 200 to 300 Mohms. The high input resistance of the threshold value trigger 5 also must be as temperature-independent as possible. For the impedance conversion there is provided for the motor protection relay of FIG. 2 a switch mechanism 8, the switching path of which is connected in the supply liner conductor 10 for the motor simulator 4.

The switch mechanism or switch 8 is actuated by a clock generator 9. The clock generator 9 produces a square wave voltage with a clock ratio $T_V$ (working cycle to rest cycle), which is considerably smaller than 1, for instance amounts to 1/2,000. During the work cycle the switching path of the switching mechanism 8 is conductive and during the rest cycle is non-conductive. By means of the clocked or timed application of the charging voltage of the motor simulator 4 at the threshold value trigger 5 its input resistance is effectively increased by the reciprocal value of the clock ratio $T_V$ and the motor simulator 4 is accordingly less loaded. For an effective input resistance of, for instance, $2 \times 10^{10}$ ohms the threshold value trigger, with a clock ratio of 1/2,000, accordingly can possess an input resistance of 10 Mohms, something which can be realized by using conventional components.

By means of the switch mechanism 8 there is also clocked or cycled the charging current $I_L$ of the controllable charging current source 3 and for the supply of the motor simulator 4 the clock ratio $T_V$ is correspondingly reduced, so that for an effective charging current $I_i^+$ in the order of magnitude of $10^{-9}$ amperes the current intensity of the charging current $I_L$ is in the order of $10^{-6}$ amperes and for the charging current source 3 there can be employed relatively simple circuit arrangements. If clocking of the charging current $I_L$ is not necessary, then the switching path of the switch mechanism 8 can be connected at the input conductor 11 of the threshold value trigger 5. As in indicated by the broken lines of FIG. 2 the clock generator 9 alsocts upon the threshold value trigger 5, so that such does not trigger the switch mechanism 8 in the presence of a non-conductive switching path. The previously described motor protection relay is especially suitable for motors in which the motor current does not change very much. If the motor current changes in the ratio of, for instance, 1 to 20, then the squaring block 6 must possess a control range of 1 to 400, so that a considerably greater expenditure would be necessary. A protection relay for motors with large current fluctuations or changes has been depicted in the block circuit diagram of FIG. 3.

Figure 3:
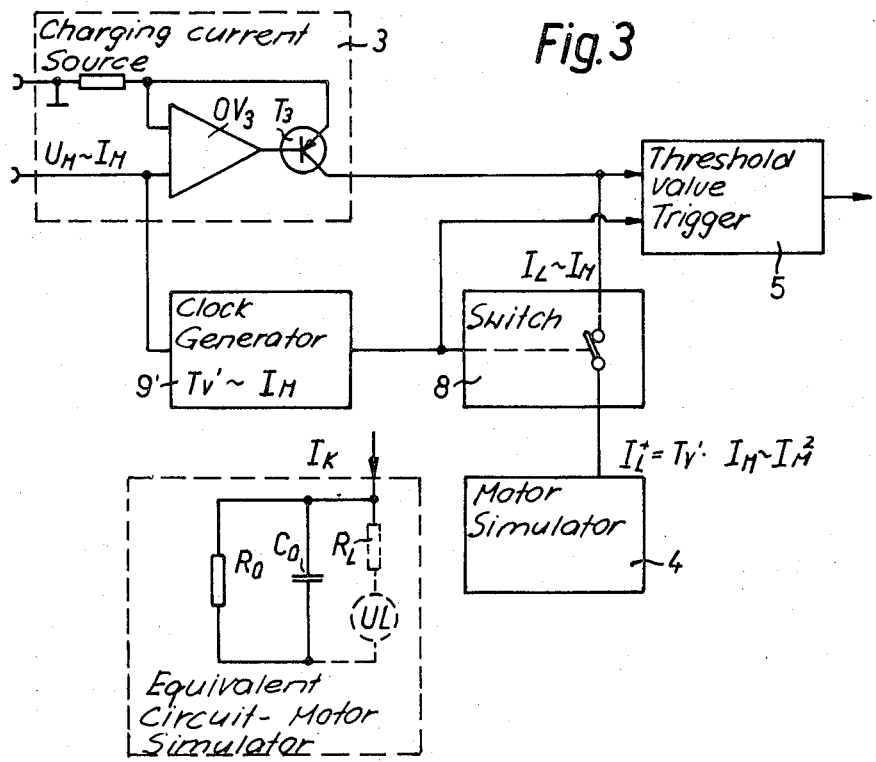
FIG. 3 is a block circuit diagram of a different exemplary embodiment of motor protection relay in which again a capacitive storage is supplied with a charging current proportional to the square of the motor current.

With the motor protection relay of FIG. 3, as is the case for the embodiment of FIG. 2, the output of the charging current source 3 is connected with the control input of the threshold value trigger 5 and via the switching path of the switch mechanism 8 with the motor simulator 4. The switch mechanism 8 is controlled by the clock generator 9' and by means of its clock or timing signal the threshold value trigger 5 is blocked against responding when the switching path of the switch mechanism 8 is non-conductive. The charging current souce 3 consists in this embodiment, however only of an amplifier circuit with an operational amplifier $OV_3$ which is controlled by the measurement voltage $U_M$ and a transistor $T_3$ for generating a charging current $I_L$ which is proportional to the motor current $I_M$. Further, the clock generator 9' is controlled by the measurement voltage $U_M$ in order to generate square-wave voltages, the work pulses of the same pulse width of which follow one another at a frequency proportional to the motor current $I_M$, so that the clock ratio $T_V{}'$ is proportional to the motor current. The effective charging current $I_L{}^+$ for the motor simulator 4 is equal to the product of the clock ratio $T_V{}' \sim I_M$ and the charging current $I_L \sim I_M$ and therefore proportional to the square of the motor current $I_M$.

For a change in Hence, effective charging current $I_L{}^+$ of 1 to 400 there is only required, with this embodiment, that the amplifier circuit of the charging current source 3 and the clock generator 9' respectively only have a control region of 1 to 20 and the squaring block is completely omitted. Hence apart from a saving in components there is also provided greater accuracy and the thermal stability of the motor protection relay can be attained more easily since the amplifier circuit of the charging current source 3, the clock generator 9' and also the threshold value trigger 5 can be fabricated without any great expenditure with an accuracy of approximately 1 percent. Only in the case of the switch mechanism 8, which is a semi-conductor device, and for the motor simulator 4, are the temperature-dependent leakage currents of the switch path and the capacitors $C_1$, $C_2$, which impair the accuracy at higher temperatures, to be taken into account. Occurring leakage currents lead to falsification of the final value of the charging at the motor simulator and therefore bring about a change in the response or trigger time. In order to be able to take into account the leakage currents there are connected at the equivalent circuit diagram of the motor simulator at the (ideal) capacitor $C_o$ a resultant leakage voltage $U_L$ and a resultant resistance $R_L$. The sum of all of the leakage currents attempts to shift, via the leakage resistor $R_L$, the motor simulator to the resultant leakage voltage $U_L$.

The error in the final value of the charge and in the response or trigger time is at a minimum, if the sum of all leakage currents of the motor simulator, with removed discharge resistor $R_o$ (see the equivalent circuit diagram) just approaches the release or trigger threshold $U_A$.

Mathematical Derivation

Since essential changes of the response or trigger time only can be expected for motor currents in the order of 1.1 $I_N$, there can be considered in the equivalent circuit diagram of the motor simulator as a simple RC-element, the components $R_o$, $C_o$. The capacitor $C_o$ is charged by a constant current $I_K$ which is of such magnitude that the final value $U_E$ of the current for infinite leakage resistance $R_L$ (no leakage currents) is somewhat greater than the trigger threshold $U_A$, for instance $U_E = 1.1\ U_A$.

With infinitely large leakage resistance, $R_L = \infty$, then from the equation $U_A = U_E(1 - e^{-t_{01}/\tau_1})$ and with the time constant $\tau_1 = R_o C_o$ there can be derived the trigger or response time $t_{01} = \tau_1 \ln U_E/U_E - U_A = \tau_1 \ln R_o I_K/R_o I_K - U_A$.

With infinite leakage resistance $R_L$ the capacitor $C_o$ is pre-changed via the leakage voltage $U_L$ to $U_o = U_L(R_o/R_o + R_L)$.

The time-constant is $\tau_2 = R_o R_L/R_o + R_L \cdot C_o$ and the terminal or final value of the charge $U_{E2} = U_L R_o/R_o + R_L + R_o R_L/R_o + R_L I_K$.

From $U_A = U_o + (U_{E2} - U_o)(1 - e^{-t_{02}/\tau_2})$ there can be attained, by replacing the values $U_o$ and $U_{E2}$ and after transformation, for the trigger time $t_{02} = \tau_2$. ln $R_o I_K / R_o I_K + R_o/R_L\ U_L - U_A/R_L\ (R_o + R_L)$ If for simplication purposes it is assumed that the timeconstants are equal, $\tau_2 = \tau_1$ ($R_o = O$, removed discharge resistor $R_o$) then the trigger times are equal, $t_{01} = t_{02}$, when $U_L = U_A$. The trigger times thus change analogous to the effective time-constant independent of how slowly the e-function approaches the trigger threshold value.

Figure 4:
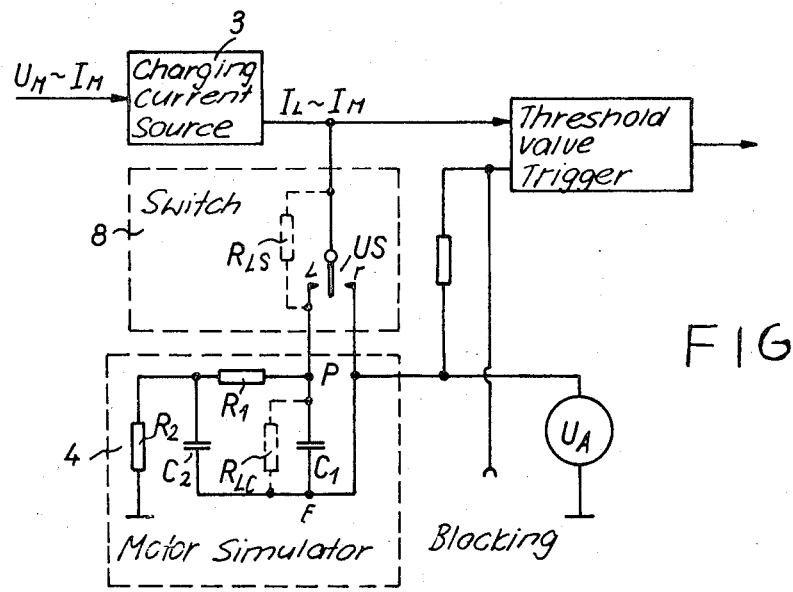
FIG. 4 is a circuit diagram of a motor simulator or motor simulation circuit, a threshold value trigger and a switch mechanism for the clock supply of the motor simulator and for the clocked or cycled application of the charging voltage of the motor simulator at the threshold value trigger.

A corresponding circuit has been depicted in FIG. 4. The switch or switch mechanism 8 contains a reversing switch US with the leakage resistance $R_{LS}$, which has been depicted in phantom lines in the drawing. The bottom end or base point $F$ of both capacitors $C_1$ and $C_2$ of the motor simulator is applied to the trigger voltage $U_A$. The phantom-line depicted resistance $R_{LC}$ constitutes the leakage resistance of both capacitors. The discharge resistor $R_2$ is grounded, so that the base point $F$ of the capacitors $C_1$ and $C_2$ is high as concerns its potential. In the work position $l$ of the reversing switch US the hottest point $P$ of the motor simulator circuit 4 is connected with the charging current source 3 and the control input of the threshold value trigger 5. In the rest position $r$ of the reversing switch US the base point $F$ of the capacitors is connected with the control input, at which there is applied the trigger voltage $U_A$. The leakage currents therefore act in the manner that the switch or circuit point $P$, as concerns its voltage, is shifted towards the trigger voltage $U_A$. The threshold value trigger 5 responds as soon as the voltage at the circuit P is greater than the trigger or response voltage. In order that the threshold value trigger 5 can respond, the charging current $I_L$ must be at least so great that the voltage drop $(R_1 + R_2) \times I_L$ is somewhat greater than the trigger or response voltage $U_A$. In order that the threshold value trigger 5 does not trigger in the rest position $r$ of the reversing switch, in this switch position its threshold value input receives, for blocking purposes, a sufficiently high pre-bias from the clock generator.

Figure 5:
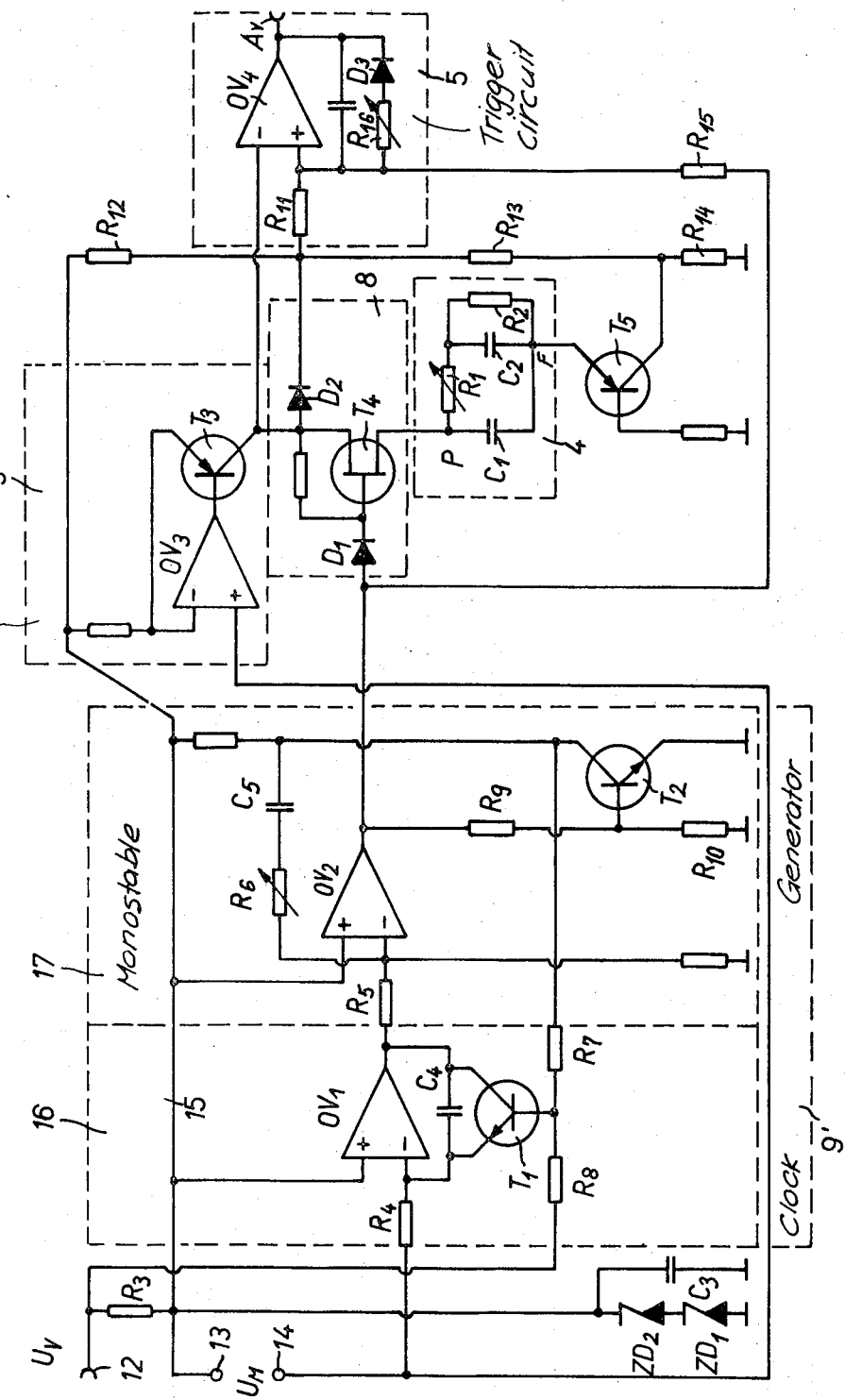
FIG. 5 is a circuit diagram of a motor protection relay, designed corresponding to the block circuit diagram of FIG. 3, and which contains the circuit arrangement of FIG. 4.

FIG. 5 illustrates, by way of example, a circuit diagram of a motor protection relay constructed in accordance with the block circuit diagrams of FIG. 3 and FIG. 4.

By means of the connection terminal 12 the motor protection relay is connected with a supply voltage $U_V$ of, for instance, 20 volts of a non-stabilized direct-current voltage. From the supply voltage $U_V$ there is derived a stabilized reference voltage $U_{ref}$ by means of a resistor $R_3$, two reference diodes $ZD_1$, $ZD_2$ and a smoothing capacitor $C_3$ and such is then applied to the supply conductor or line 15. At the input terminals 13, 14 there appears the measurement voltage $U_M$. The clock generator 9 consists of an integrator 16 with a reset means and a monostable multi-vibrator 17 with a Schmitt-trigger input. The integrator 16 contains an operational amplifier $OV_1$, at the plus- input or non-inverting input of which there is applied the reference voltage $U_{ref}$ and at its minus- input and inverting input there is applied via a resistor $R_4$ the measurement voltage $U_M$. At the minus- input and the output of the operational amplifier $OV_1$ there is connected a capacitor $C_4$ which is bridged by the collector-emitter path of a transistor $T_1$. The monostable multi-vibrator 17 likewise contains an operational amplifier $OV_2$, at the plus-input of which there is applied the reference voltage $U_{ref}$. The minus- input of this operational amplifier $OV_2$ is connected via a resistor $R_5$ with the output of the operational amplifier $OV_1$ and via a trimmer potentiometer $R_6$ and a capacitor $C_5$ with the collector of a transistor $T_2$. The base voltage divider $R_9$, $R_{10}$ of this transistor $T_2$ is connected to the output of the operational amplifier $OV_2$. The base voltage divider $R_7$, $R_8$ for the transistor $T_1$ of the integrator 16 is located at the connection terminal 12 for the supply voltage $U_V$ and at the collector of the transistor $T_2$ of the multi-vibrator 17, so that there can be obtained resetting of the operational amplifier $OV_1$. With the transistor $T_1$ non-conductive or blocked the output voltage of the integrator 16 changes linearly as a function of time with a slope which is proportional to the measurement voltage and therefore proportional to the motor current $I_M$. If the output voltage reaches the response threshold at the operational amplifier $OV_2$ then such delivers a pulse (work cycle) of constant pulse width, by means of which, via the transistor $T_2$, the transistor $T_1$ is rendered conductive and the integrator is reset.

The time-duration between two pulses is indirectly proportional to the measurement voltage $U_M$ and therefore to the motor current $I_M$. At the clock generator, with constant pulse width, the frequency accordingly changes with the motor current $I_M$. The trimmer potentiometer $R_6$ serves for calibrating the motor protection relay. The output of the clock generator 9', corresponding to the showing of FIG. 3, is connected with the switch mechanism 8 and the threshold value trigger 5, which circuit components have been depicted in FIG. 5 by the phantom line borders. The switch mechanism 8 contains as the reversing switch a field-effect transistor $T_4$ in combination with a diode $D_2$ for the rest position (FIG. 4). The collector of the transistor $T_3$ of the charging current source 3 (FIG. 3) is connected via the source-drain path of the field-effect transistor $T_4$ with the circuit point or terminal $P$ of the motor simulator 4 (FIG. 4) and the source electrode is applied via the diode $D_2$ and the resistor $R_{11}$ at an input of the threshold value trigger 5.

The threshold value trigger 5 consists of an operational amplifier $OV_4$, the minus- input of which is connected with the collector of the transistor $T_3$ of the charging current source 3 and with the source electrode of the field-effect transistor $T_4$. The plus- input is applied via the resistor $R_{11}$ at a voltage divider $R_{12}$, $R_{13}$, $R_{14}$ for generating the threshold value voltage $U_A$ and is connected via a resistor $R_{15}$ with the output of the clock generator 9'. The output of the operational amplifier $OV_4$ is feedback coupled via a diode $D_3$ and an adjustable resistor $R_{16}$ with the plus- input. With the field-effect transistor $T_4$ conductive (working cycle) and as soon as the voltage at the circuit point $P$ of the motor simulator has reached the threshold value $U_A$ then the operational amplifier $OV_4$ becomes conductive, whereby its output voltage shifts to null or zero and the relay $A$ (FIG. 1) is de-energized. By means of the thus effective positive feedback the operational amplifier $OV_4$ is retained in its switched position, wherein the adjustment of the point in time where it again switches-on can be set by the resitor $R_{16}$. During the rest cycle there appears at the plus- input of the operational amplifier $OV_4$, via the resistor $R_{15}$, the positive blocking voltage of the field-effect transistor $T_4$, so that the operational amplifier $OV_4$ can only switch to its triggering or response operation during one working cycle, this is when the field-effect transistor $T_4$ is conductive.

The base point $F$ of the capacitors $C_1$, $C_2$ of the motor simulator circuit 4 is applied via the emitter-collector path of a transistor $T_5$ at the resistor $R_{14}$ of the voltage divider $R_{12}$, $R_{13}$, $R_{14}$, therefore it is lower potential than the trigger voltage $U_A$. In this way there is prevented that upon interruption of the current supply there will be present charging to a voltage which is sufficient for carrying out triggering, which would be the case if the base point F were at trigger voltage. Upon interruption of the power supply the capacitors $C_1$ and $C_2$ of the motor simulator 4 discharge to null across the transistor $T_5$. This transistor $T_5$ accordingly protects the motor simulator in the case of interruption or breakdown in the power supply and additionally can also shut-off the motor in the case of such power supply failure, so that upon restarting the proper starting conditions will prevail at the motor simulator.

While there is shown and described present preferred embodiments of the invention, it is to be distinctly understood that the invention is not limited thereto, but may be otherwise variously embodied and practiced within the scope of the following claims. ACCORDINGLY,

What is claimed is:

1. An electronic motor protection relay with current-dependent triggering thereof and controlled by a measurement voltage proportional to the motor current, comprising an electric motor simulation circuit including a capacitor storage wherein charging of the capacitor storage characterizes the heating behavior of the motor, a controlled charging current source controlled by the measurement voltage, said charging current source serving to supply the electric motor simulation circuit with a charging current which by means of the measurement voltage is a function of the motor current, a threshold value trigger circuit having a control input, the charging voltage being applied via capacitors of said motor simulation circuit to the control input of said threshold value trigger circuit, said threshold value trigger circuit initiating cut-off of the motor current as soon as the charging voltage exceeds a trigger threshold value, said motor simulation circuit being supplied with a charging current proportional to the square of the motor current, said electrical motor simulation circuit comprising two RC-elements, wherein the capacitor of one of said two RC-elements determines the thermal capacity of the copper windings of the motor and the resistor of said one RC-element determines the heat transfer resistance of the motor winding to the motor stator, the capacitor of the other RC-element determining the thermal capacity of the motor stator and the resistor of said other RC-element determining the heat transfer resistance of the motor stator with respect to the ambient air, the influence of leakage currents of said motor simulation circuit and a switch mechanism upon the trigger time being reduced by the switch mechanism containing reversing switch means which in operative position connects the input of said motor simulation circuit to said controlled charging current source, in the inoperative position said reversing switch means applies, via leakage resistances of said switch mechanism and said motor simulation circuit, the trigger threshold voltage to said threshold value trigger circuit, the base point of the capacitors of said motor simulation circuit being at a greater potential and the threshold valve trigger circuit being triggered as soon as the voltage at the input of the motor simulation circuit is greater than the trigger threshold voltage, said switch mechanism being actuated by a clock generator comprising a field-effect transistor, the source-drain path of which connects the input of said motor simulation circuit with said controlled charging current source, the source electrode of said field-effect transistor being connected via a diode, which determines the inoperative position of said reversing switch means, with the control input of said threshold value trigger circuit.

2. The motor protection relay as defined in claim 1, further including transistor means controlled by the supply voltage of the motor protection relay, said relay being connected with a base point of said motor simulation circuit, the capacitors of said motor simulation circuit, upon interruption of the power supply, discharging across said transistor means.

3. The motor protection relay as defined in claim 2, wherein said threshold value trigger circuit comprises an operational amplifier having input and output, the output of said operational amplifier being connected with said input to which there is applied the trigger voltage via a feedback circuit having an adjustable resistor for adjusting the reswitching in time.

* * * * *